Figures 1, 2:
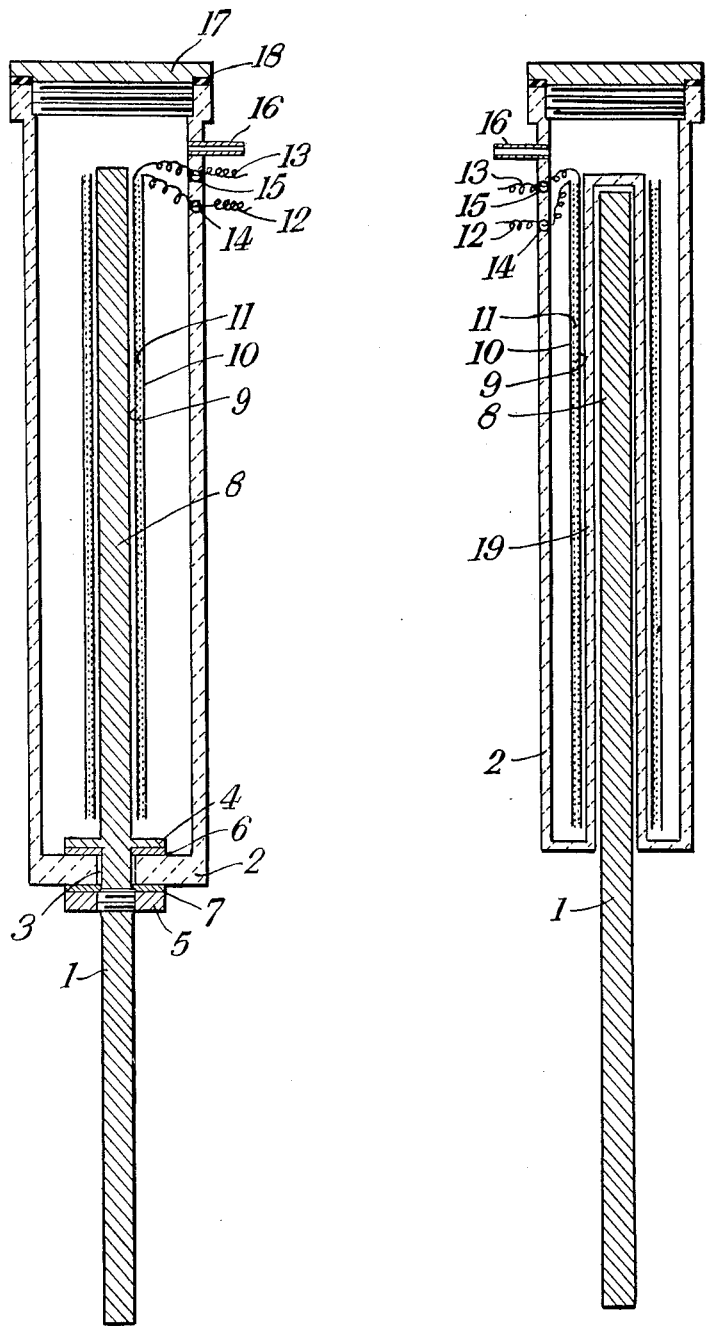

United States Patent Office 3,202,843
Patented Aug. 24, 1965

3,202,843
THERMIONIC CONVERTERS
Harry Hurst, Foxton Hall, Foxton, England
Filed Dec. 8, 1959, Ser. No. 858,097
5 Claims. (Cl. 310—4)

In British Patent No. 797,872, I have described a method of generating electricity by means of a single thermionic cell, comprising two or more electrodes within an enclosing heat-resistant envelope which may be evacuated or contain gas or vapour, in which the application of external heat causes a flow of electrons from an emissive electrode to a collector electrode such that, when these electrodes are connected through an external load circuit, a net current flows through the system.

According to the present invention, a similar effect is achieved by altering the site of application of the heat source. Instead of applying heat directly to the heat-resistant envelope of thermionic cells, heat is transmitted to the electrodes by means of a rod or similar device passing through the wall of the envelope. The external portion of the rod is in contact with the heat source, whereas the internal portion constitutes a base on which the electrode assembly is mounted in such a way as to provide a desirable gradient or difference in temperature between emitter and collector electrodes. This depends on the internal heating device being the site of highest temperature within the envelope through which heat loss occurs. Thus, an electrode assembly in which the emissive electrode is in close thermal contact with the device will ensure that the surrounding collector is at a lower temperature. By appropriate electrode design, the most efficient gradient in temperature may be realised.

With a system of this kind the envelope need not necessarily be vacuum-tight at high temperatures or heat-resistant. It is desirable that the heat-transmitting device should be of high thermal conductivity and relatively large in cross-section in order to maintain the electrodes at suitable operating temperatures. The seal between the heat-transmitting device and the envelope should be vacuum-tight and of low thermal conductivity to avoid unnecessary heat loss through the envelope. Alternatively, the end of the envelope may be constructed in a manner analogous to the inner container of a vacuum flask to form a sheath enclosing the portion of the rod around which the electrode system is mounted. This eliminates the need for a vacuum-tight heat resistant seal, as heat will be transmitted from the rod to the internal sheath enclosed by the electrode system.

With such a thermionic cell, one end of the envelope may be demountable to permit the attachment of the electrode assembly to the internal heating device, this being a desirable advantage where electrode replacement or modification may be necessary.

With thermionic cells or converters such as described some of the electrons emitted from the inner electrode or cathode have sufficient kinetic energy to overcome the potential barrier between the cathode and outer electrode or anode on which these electrons condense. At the anode the kinetic energy of the electrons is converted into potential energy which may be utilised by connecting the anode and cathode through an external load circuit of suitable impedance.

Having thus described the general nature of the present invention, it is clear that many modifications may be envisaged.

The cells may vary considerably in shape, and may be circular or flat in cross-section. The heating rod or device may be similarly modified to facilitate more efficient heat exchange between the source and electrode assembly. The emitter and collector electrodes may comprise a series of plates to increase current generating capacity. They may also be fabricated in the form of replaceable units for mounting on the heating base within the cell, which may contain a proportion of gas or metallic vapour, such as caesium, as the latter has a low ionization potential, positive ions will be formed by contact of the gaseous metal with the hot electrode surface. These ions will tend to neutralise the electron space charge barrier between the electrodes and so augment net current flow. In the present invention an effect analogous to the above may be achieved by a system in which both emitter and collector electrodes constitute respectively the electron donor and acceptor surfaces of a semi-conductor layer sandwiched between, the whole functioning as a kind of high temperature transistor, which is itself a generator. More than one such assembly may be contained within a single envelope. As mentioned in British Patent No. 797,872, radioactive material may be incorporated within the cell or used as an external source of irradiation in order to enhance ionisation and increase net current generated.

As assemblage of cells may be connected electrically in parallel or series, according to current generating capacity or voltage desired. The envelopes may be joined by vacuum-tight tubes and sealed to a manifold which is connected to a high-vacuum supply line, thus counteracting the effects of leaks through the envelope. The latter may be made of glass, quartz, ceramic or metal as desired and provided with a demountable end through which the electrodes may be inserted and connected externally to the load circuit through suitable seals in the envelope.

The electrodes and emissive materials may be similar to those described in British Patent No. 797,872. The emissive electrode may be of nickel, molybdenum or tungsten, and coated with a barium oxide-strontium oxide layer. Where relatively high operating temperatures are desirable, the emissive electrode may be tungsten coated with thorium oxide as in commercial thoriated tungsten cathodes.

The emissive layer may be in contact with the collector electrode. In a semi-conductor system of this type the layer should be adjusted to maintain low thermal conductivity and high electrical conductivity. The latter property may be increased by the incorporation of finely divided carbon or other conducting material, such as metal, to form a discontinuous phase in the continuous emissive phase.

Certain embodiments of apparatus according to the invention will now be described by way of example, with reference to the accompanying drawings in which:

FIGS. 1 and 2 represent diagrammatic vertical sections through alternative forms of apparatus.

In the apparatus shown in FIG. 1, the heating rod 1 is made of nickel and penetrates the end of the ceramic container 2 through the hole 3. The rod is held in position by means of the internal flange 4 and outer threaded collar 5. A vacuum-tight heat resistant seal is produced by copper washers 6 and 7 compressed by tightening the collar. The washers, flange and collar are coated with a low melting-point solder, such as silver or lead solder. The solder becomes molten at the operating temperature, but it is present in such thin layers between the various surfaces that it is held in position by surface forces and acts as a high temperature metallic "grease."

The inner portion of the rod 8 is ensheathed by the emissive cylindrical nickel electrode 9 which is separated from the surrounding molybdenum collector electrode 10 by the emissive layer 11, which consists of a mixture of barium and strontium oxides containing a small proportion of finely divided carbon. Both electrodes are in contact with this semi-conductor layer.

The collector and emissive electrodes are connected to molybdenum wires 12 and 13, which pass through the envelope by means of the vacuum-tight seals 14 and 15 respectively.

The envelope may be evacuated by means of the tube 16 through which gas or metallic vapour may be subsequently introduced; or the apparatus may be continuously connected to the high-vacuum line during operation. The gas source and the evacuation pump are grouped under the generic term "gas control source" in this specification. The demountable end of the container 17 may be unscrewed to permit introduction of the electrodes; a vacuum-tight seal is maintained by the rubber or lead gasket 18.

FIG. 2 shows an apparatus similar to that in FIG. 1, where the components 1, 2 and 8–18 are similar. In FIG. 2, however, the envelope forms an internal sheath 19 around the portion 8 of the heating rod; the electrode assembly is slid into position around the internal sheath through the demountable cap 17.

In further modifications, the single heating rod may divide within the envelope into two or more heating elements on each of which an emitter and collector electrode system is mounted. These internal units may be connected electrically in series or in parallel according to the voltage or amperage desired. Alternatively, a number of heating rods may extend through a single envelope to form a similar battery of internal generating elements. The geometry of the rods and generating units may be modified to give maximum efficiency for the particular operating conditions at which thermionic emission occurs. The operating temperature is usually in the region of 900–1100° C., but may be higher or lower depending on the materials and type of cell.

What I claim as my invention and desire to secure by Letters Patent is:

1. A thermionic converter for generating electricity comprising a vacuum-tight vessel of heat resistant material, a tubular cathode mounted within said vessel, a tubular anode within said vessel and surrounding said cathode, a layer of electron emitting material between said cathode and said anode, output electrical conductors connected respectively to said cathode and said anode and extending through the wall of said vessel to the exterior thereof, and a solid energizing heater rod of thermally conducting material having one end disposed within said cathode and having its other end projecting from one end of said vessel for conducting heat to said cathode from an external heat source.

2. A converter as claimed in claim 1, having a demountable cup at the end of said vessel opposite said one end.

3. A converter as claimed in claim 1, wherein said rod extends into said tubular cathode through the wall of said vessel, said cell including a heat-resistant, vacuum-tight seal between said rod and the wall of the vessel.

4. A thermionic converter for generating electricity comprising a vacuum-tight vessel of heat resistant material, a tubular cathode mounted within said vessel, a tubular anode within said vessel and surrounding said cathode, a layer of electron emitting material between said cathode and said anode, output electrical conductors connected respectively to said cathode and said anode and extending through the wall of said vessel to the exterior thereof, and an energizing heater rod of thermally conducting material disposed within said cathode and having an end projecting from one end of said vessel for conducting heat to said cathode from an external heat source, the wall of said vessel having a re-entrant portion extending into and through said tubular cathode and said rod being positioned within said re-entrant portion.

5. A converter as claimed in claim 4, wherein said vessel has a gas passage for communication between the interior of the vessel and a gas control source for the maintenance of a predetermined condition within the vessel.

References Cited by the Examiner

UNITED STATES PATENTS

| | | | |
|---|---|---|---|
| 2,156,048 | 4/39 | Baier | 313—318 |
| 2,437,576 | 3/48 | Wick. | |
| 2,510,397 | 6/50 | Hansel | 310—4 X |
| 2,688,648 | 9/54 | McIlvaine | 310—4 |
| 2,759,112 | 8/56 | Caldwell | 310—4 X |
| 3,093,757 | 6/63 | Lederer | 310—4 |

ORIS L. RADER, *Primary Examiner.*

DAVID X. SLINEY, MILTON O. HIRSHFIELD, *Examiners.*